(12) United States Patent
Kuwahara (10) Patent No.: US 6,639,689 B1
(45) Date of Patent: Oct. 28, 2003

(54) FACSIMILE APPARATUS

(75) Inventor: Tetsuya Kuwahara, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/376,100

(22) Filed: Aug. 17, 1999

(30) Foreign Application Priority Data

Aug. 19, 1998 (JP) ............................................. 10-270448

(51) Int. Cl.[7] .............................................. G06F 15/00
(52) U.S. Cl. ....................... 358/1.15; 358/404; 358/407
(58) Field of Search ............................. 358/1.15, 404, 358/405, 407, 442, 444, 401, 402, 468; 379/100.09

(56) References Cited

U.S. PATENT DOCUMENTS

| | | | | |
|---|---|---|---|---|
| 5,111,307 A | * | 5/1992 | Yoshino | 358/400 |
| 5,127,047 A | * | 6/1992 | Bell et al. | 358/439 |
| 5,155,601 A | * | 10/1992 | Toyama | 358/401 |
| 5,157,514 A | * | 10/1992 | Yoshioka | 340/825.49 |
| 5,175,634 A | * | 12/1992 | Matsuzaki | 358/407 |
| 6,144,462 A | * | 11/2000 | Kaplan | 358/405 |

FOREIGN PATENT DOCUMENTS

| | | | | |
|---|---|---|---|---|
| JP | 09083701 | 3/1997 | | H04N/1/00 |

* cited by examiner

*Primary Examiner*—Mark Wallerson
(74) *Attorney, Agent, or Firm*—Hogan & Hartson, LLP

(57) ABSTRACT

A relay broadcast instructing station transmits to a relay broadcast distributing station final distribution recipient's SID, SUB, TSI, and DCS information as well as facsimile data. The relay station then transmits the facsimile data to the recipients. The relay station also sends back to the instructing station a report indicating the delivery status of the facsimile data. The facsimile numbers of the recipients and the facsimile number of the instructing station are pre-stored in a memory of the relay station, and used for the distribution of the facsimile data to the recipients and for the transmission of the distribution report back to the instructing station.

38 Claims, 7 Drawing Sheets

| (a1) | (b1) | (c1) |
|------|------|------|
| SUB | SID | FINAL DISTRIBUTION RECIPIENT FAX NUMBERS |
| A1 | B1 | 222 – 1111 |
| A1 | B1 | P |
| A1 | B1 | SPEED – 001 |
| A2 | B2 | 321 – 7890 |
| A2 | B2 | |

FIG. 5

| (a2) TSI | (b2) NECESSITY OF BROADCAST DISTRIBUTION RESULT REPORT | (c2) BROADCAST DISTRIBUTION RESULT REPORT RETURN FAX NUMBER |
|---|---|---|
| 123 – 4567 | YES | 123 – 4567 |
| +01 – 123 – 4567 | YES | 001 – 1 – 123 – 4567 |
| +01 – 123 – 4599 | NO | — |
| — | — | — |

FACSIMILE APPARATUS

BACKGROUND OF THE INVENTION

1. Field of the Invention

The present invention relates to a facsimile apparatus having a relay broadcast distribution function.

2. Description of the Related Art

As communications technology progresses, facsimile machines equipped with an ever increasing variety of functions are being developed. One such function is a relay broadcast distribution function. A facsimile machine equipped with such a function may act as a relay broadcast distributing station (a child station), receiving document data (facsimile data) transmitted from a relay broadcast instructing station (the parent station), and delivering the document data to final distribution recipient facsimile machines (grandchild stations).

A facsimile machine provided with such a relay broadcast distribution function may return to the parent station a report indicating the result of the broadcast distributions (facsimile data delivery) to the grandchild stations (a "broadcast distribution result report"). In such case, the child station acquires a facsimile number of the parent station from a transmitter identification (typically the Transmitting Subscriber Identification, or the "TSI") of the parent station, and sends the broadcast distribution result report to the parent station facsimile using this number.

In the case of data relay and transmission in Japan, the facsimile number carried by the TSI may be, for example, either "+81-75-123-4567" or "075-123-4567". Even if the three character country code is specified, as in the former case, the CPU of the child facsimile machine is able to determine that the country code (+81) is for Japan because the relay facsimile machine is manufactured according to Japan standards. Thus, the child facsimile machine replaces the former facsimile number (+81-75-123-4567) with the latter facsimile number (075-123-4567), enabling automatic transmission of the broadcast distribution result report to the relay broadcast instructing station.

There may be a case where the first three characters indicate a country other than Japan, such as when the facsimile number contained in the TSI reads "+01-1234-5678". In such case, the child facsimile machine is unable to use this number to automatically dial the parent machine residing in a country other than Japan, and thus cannot transmit the broadcast distribution result report back to the parent machine. In other words, the conventional relay facsimile machine cannot inform the parent facsimile machine of the result of relay transmission if the country code of the relay facsimile machine (referred to as "mother country code" hereinafter) is different from that of the parent facsimile machine (referred to as "foreign country code").

SUMMARY OF THE INVENTION

It is an object of the present invention to provide a facsimile apparatus capable of transmitting a broadcast distribution result report back to the parent machine even when the parent machine's facsimile number included in the TSI contains a foreign country code which is not the same as that of the facsimile apparatus.

According to a first aspect of the present invention, there is provided a facsimile apparatus adapted to be used as a broadcast distributing station to relay facsimile data received from a relay broadcast instructing station to one or more final distribution recipient machines, including: a storage means for storing a transmitter identification received from a relay broadcast instructing station and a facsimile number corresponding to the transmitter identification, and a transmission means for dialing the facsimile number to transmit to the relay broadcast instructing station a broadcast distribution result report for the facsimile data distributed from the broadcast distributing station to the final distribution recipient machines.

The facsimile number of the relay broadcast instructing machine to which a broadcast distribution result report is to be sent can be found in the storage means of the facsimile apparatus based on the transmitter identification received from the relay broadcast instructing station. Upon successful data transmission, the facsimile apparatus, or child station, references a facsimile number data base in the storage means based on the TSI and finds out the facsimile number of the parent station. This number is subsequently dialed to send the broadcast distribution result report to the parent station. Thus, a broadcast distribution result report can be automatically transmitted to an appropriate facsimile number regardless of whether or not a code indicating a specific country is included in the TSI.

The facsimile apparatus may further include an indicating means for indicating the fact that there is no facsimile number stored in the storage means which corresponds to the transmitter identification when this is the case. As a user of the facsimile apparatus notices such indication, he or she will take appropriate measures.

DETAILED DESCRIPTION OF THE INVENTION

An embodiment of the facsimile apparatus according to the present invention will now be described in reference to the accompanying drawings.

Figure 1:
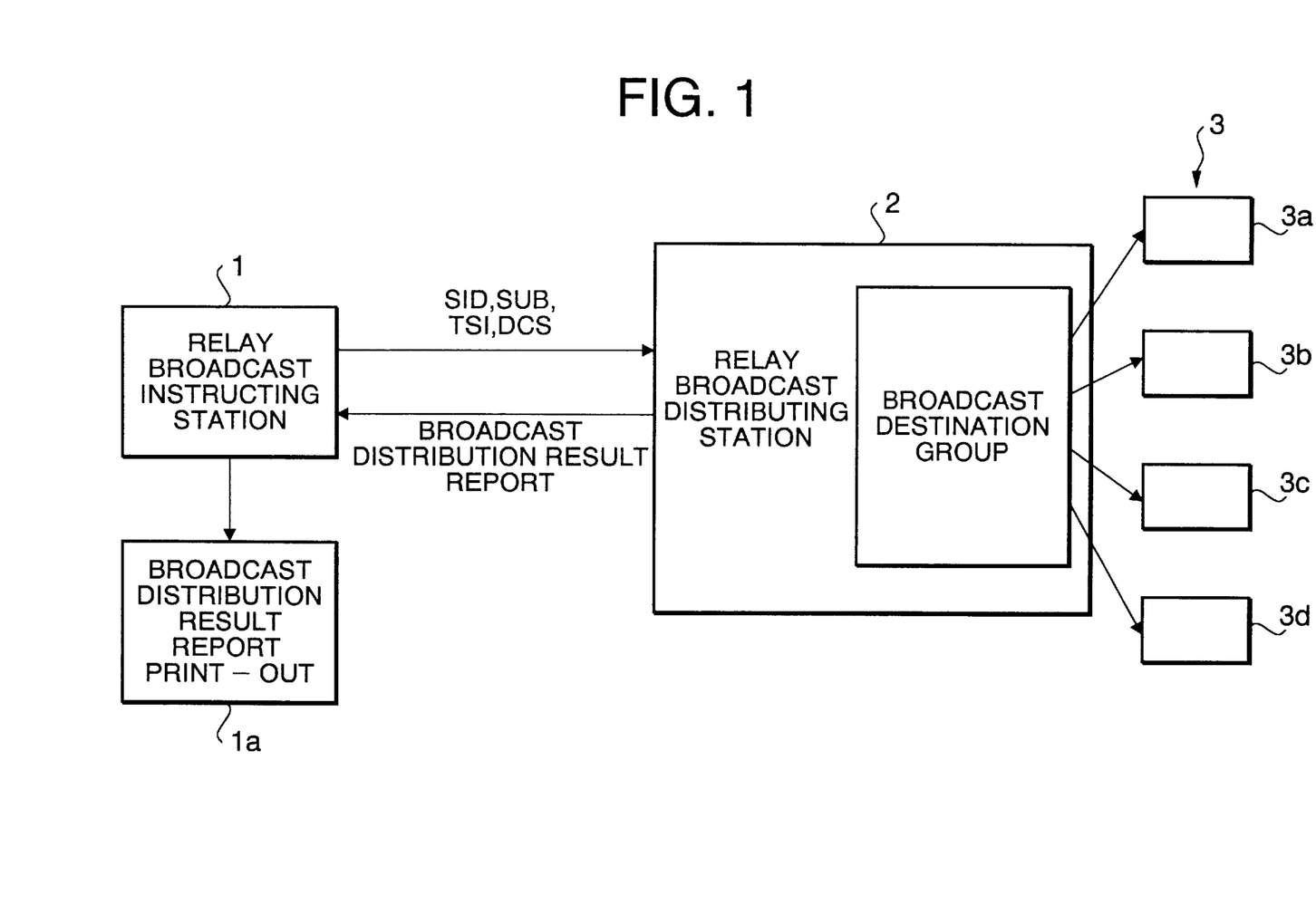
FIG. 1 is a simplified block diagram of a relay broadcast instructing station, a broadcast distributing station (facsimile apparatus of the invention) and a plurality of destinations interconnected for broadcast distribution.

Referring to FIG. 1, a relay broadcast instructing station 1 serves as the parent facsimile machine. A relay broadcast distributing station 2 is connected to the broadcast instructing station 1 and serves as the child facsimile machine according to the invention. A plurality of destination facsimile machines 3a to 3d (grandchild facsimile machines) are connected to the relay facsimile machine 2, and facsimile data is ultimately distributed to these facsimile machines 3a to 3d. In the illustrated embodiment, the facsimile machines 3a to 3d comprise in combination a broadcast group 3 which all receive the same broadcast document data.

The relay broadcast instructing station 1 transmits to the relay broadcast distributing station 2 a password (SID) of the instructing station 1, a sub-address (SUB) of the instructing station 1, a transmitting subscriber identification (TSI), and a Digital Command Signal (DCS) identifying facsimile capabilities, and then transmits the facsimile data (document data). The relay broadcast distributing station 2 delivers the facsimile data to the recipient grandchild facsimile machines 3a to 3d. The broadcast distributing station 2 then transmits to the relay broadcast instructing station 1 a broadcast distribution result report for the facsimile data distributed to the grandchild machines. A printer la at the relay broadcast instructing station 1 then prints out the broadcast distribution result report received from the relay broadcast distributing station 2.

Figure 2:
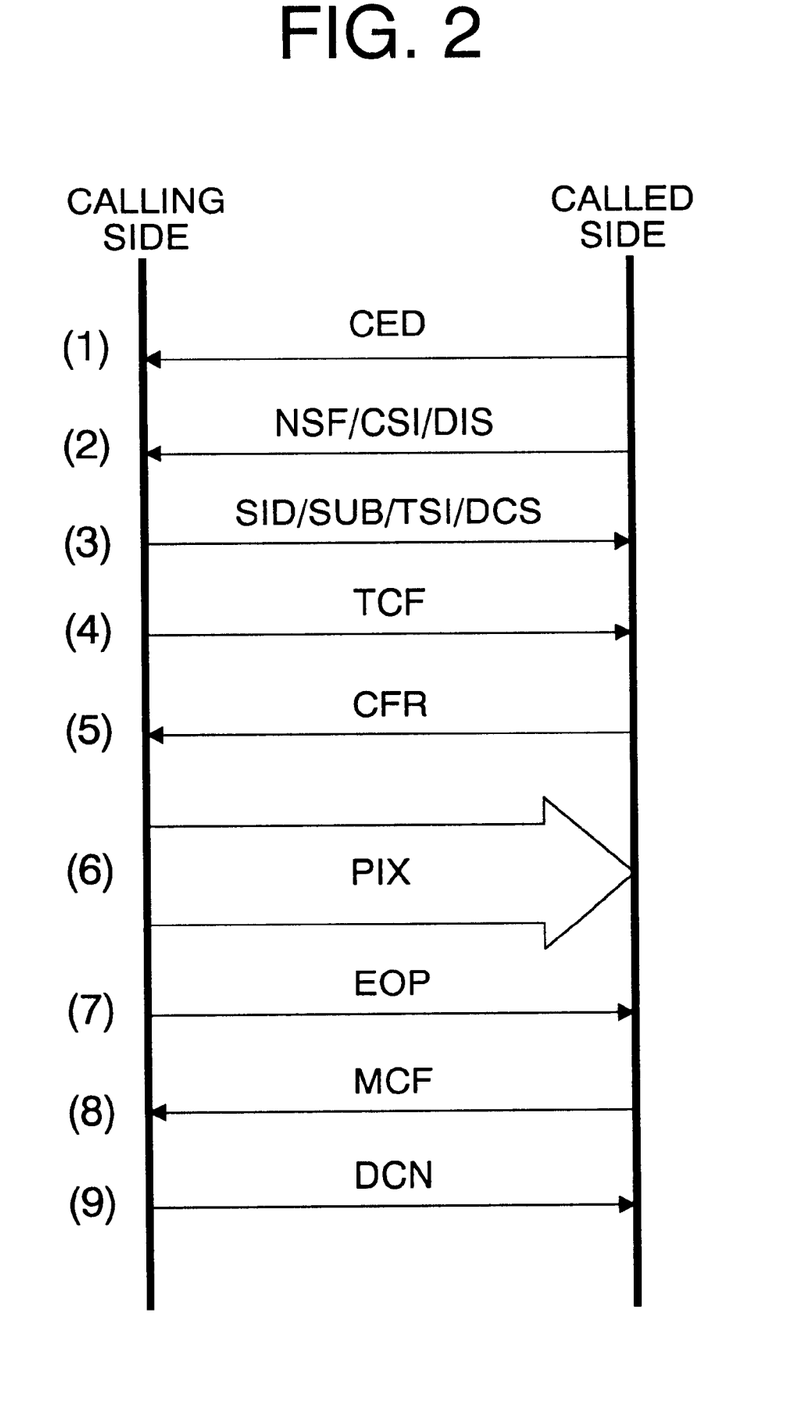
FIG. 2 illustrates a sequence of communication protocols exchanged between the relay broadcast instructing station, which makes a call, and the broadcast distributing station, which is receiving the call.

The communication protocol will now be described using FIG. 2. This diagram shows the communication protocol sequence between the relay broadcast instructing station 1, which initiates the call, and the relay broadcast distributing station 2, which receives the call. At the first procedure (1), the receiving side notices the incoming call, establishes DC circuit connection to the telephone line, and transmits its own Called Station Identification (CED) to the calling side. At the next procedure (2), the call receiving side also transmits a Non-standard Facilities (NSF) signal, Called Subscriber Identification (CSI) signal, and a Digital Identification Signal (DIS) identifying facsimile capabilities to the calling side.

At the procedure (3), the calling side transmits to the call receiving side a password (SID), a sub-address (SUB), a transmitter subscriber identification (TSI), and a Digital Command Signal (DCS) identifying facsimile capabilities. At the following procedure (4), the calling side also transmits a Training Check Signal (TCF) to the call receiving side.

At the procedure (5), the called station sends back a Confirmation to Receive (CFR) signal. At the next procedure (6), the calling station now sends the facsimile data (image data PIX) to the call receiving station. When transmission of the facsimile document has been completed, the calling side transmits an End of Page (EOP) signal to the call receiving side at the procedure (7). Subsequently, the call receiving side transmits to the calling side a Message Confirmation (MCF) signal at the a procedure (8). In response to this, the calling side transmits a Disconnect (DCN) signal to the call receiving side at the procedure (9), thus completing the facsimile data transmission to the call receiving side.

Figure 3:
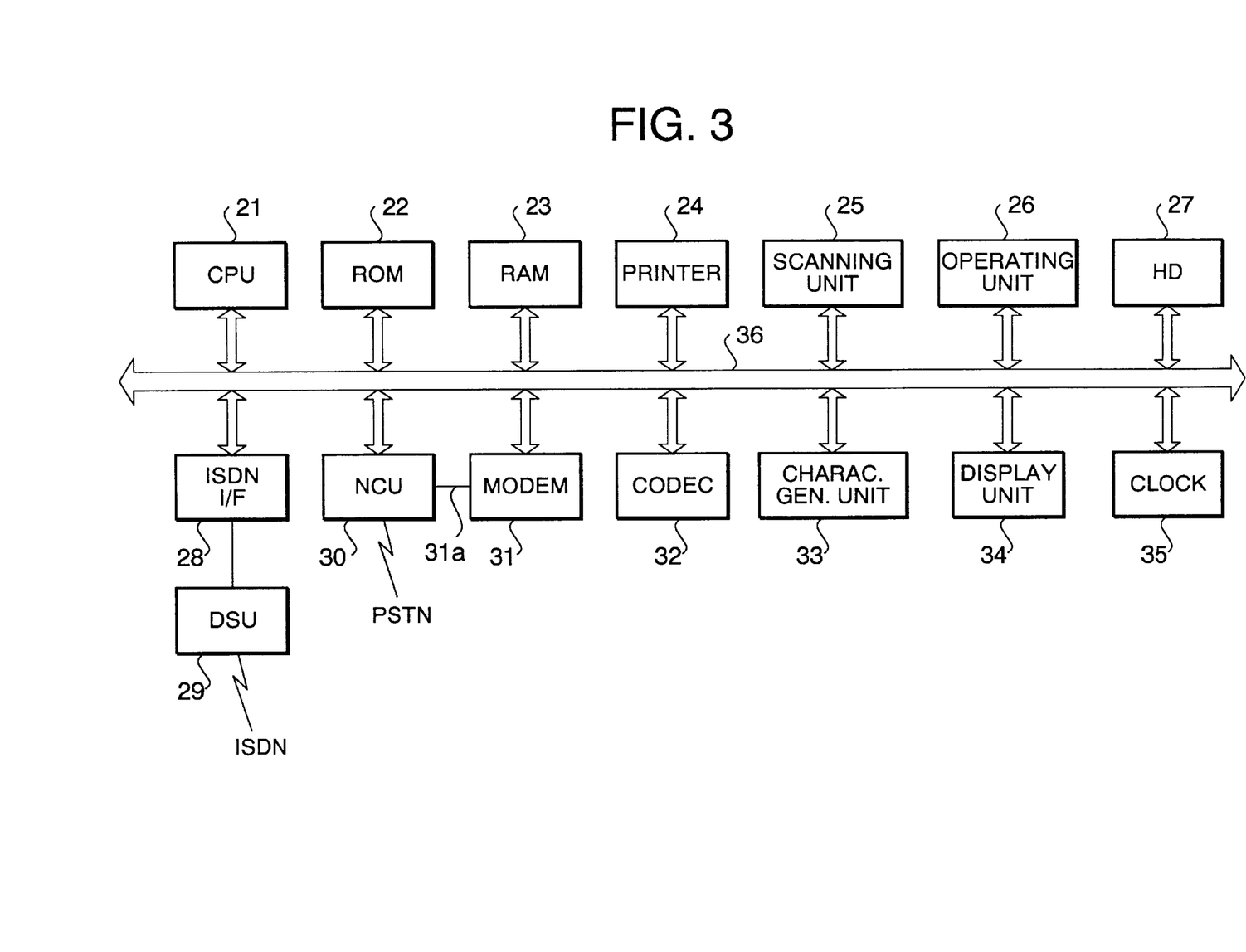
FIG. 3 is a block diagram of a facsimile apparatus serving as the broadcast distributing station.

Referring to FIG. 3, illustrated is a block diagram showing the structure of the facsimile machine of the invention serving as the relay broadcast distributing station 2. CPU 21 processes various data and signals. ROM 22 is provided for storing data and programs required for the various operations of the facsimile machine. RAM 23 stores administrative data and the like.

A printer 24 is used for outputting (printing) facsimile data onto recording sheets and a necessary notice. A scanning unit 25 is provided for scanning-in a facsimile document and outputting facsimile data as binary black-and-white image data. An operating unit 26 is comprised of a keyboard, mouse, or the like. Since the facsimile document is be comprised of graphic and/or character image data, it is preferable to use a high-capacity data storage device capable of storing a large amount of facsimile data. The present embodiment employs a hard disk 27 for storing such facsimile data.

The facsimile machine 2 is connected to an Integrated Services Digital Network (ISDN) over ISDN Interface Unit (ISDN I/F) 28 and Digital Service Unit (DSU) 29. The facsimile machine 2 is also connected to a Public-Switched Telephone Network (PSTN) via Network Control Unit (NCU) 30. A modem 31 is provided for modulating and demodulating facsimile data sent to and from remote facsimile machines over the PSTN line. The modem 31 and NCU 31 are coupled via an analog signal line 31a.

A coder/decoder (CODEC) unit 32 encodes facsimile data to be transmitted, and decodes facsimile data that is received. A graphic character generating unit 33 converts character codes into image data. A display unit 34 employs a CRT, LCD, or similar display. A clock unit 35 is used for incorporating the time into facsimile data. Reference numeral 36 designates an internal BUS.

Figure 4:
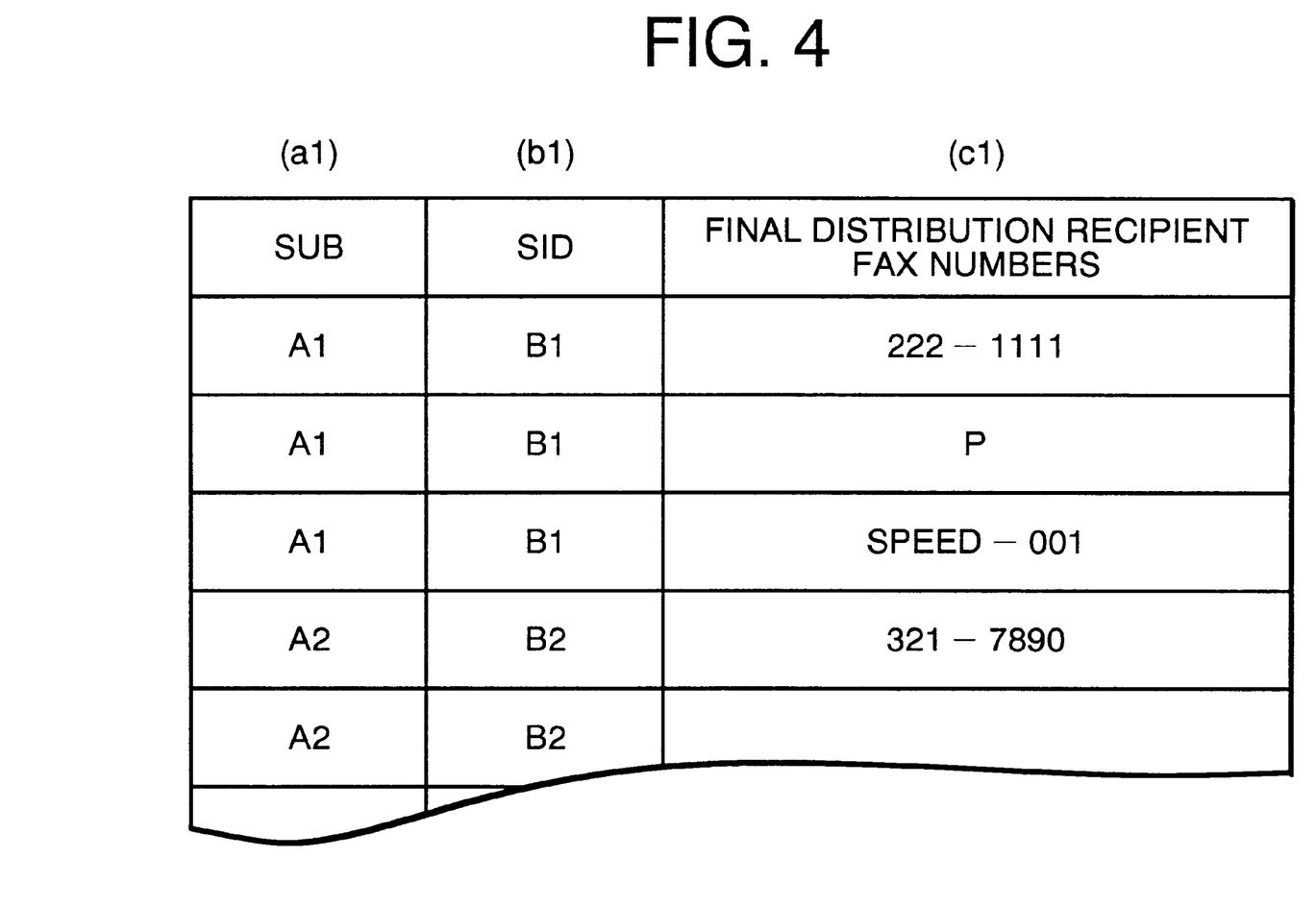
FIG. 4 illustrates a table established in the memory unit of the relay broadcast distributing station.

The facsimile numbers of the final distribution recipients (the grandchild machines 3a to 3d), and the facsimile number to which the broadcast distribution result report should be sent (the parent machine 1) are pre-stored in RAM 23 of the relay broadcast distributing station 2. These facsimile numbers are utilized to send the facsimile data to the grandchild machines, and send the broadcast distribution result report to the parent machine, Referring to FIG. 4, illustrated is an example of a table (Table 1) used to store the facsimile numbers and other data about the final distribution recipients (the grandchild machines). This table may be created in a relay distribution memory mailbox in RAM 23. The first column of the table, al, lists character codes (A1, A2, etc.), which represent the sub-addresses (SUB) indicative of the broadcast groups. Each character code is up to 20 characters long in this particular embodiment. The center column b1 lists passwords (SID) B1, B2, which may also be up to 20 characters long, and which correspond to the sub-addresses (SUB) in the left column a1.

The right column c1 lists the facsimile numbers of the final distribution recipients. The facsimile numbers may be expressed in various ways in this column. Specifically, the facsimile numbers themselves may be stored like those in rows 1 and 4 (each facsimile number may be up to 40 characters long.), or in the form of one-touch dialing numbers (including alpha-numeric characters) like that shown in row 2, or speed-dial numbers like that shown in row 3. The relay broadcast distributing station (the child machine) 2 reads out the facsimile numbers of the final distribution recipients (grandchild machines) 3a to 3d by looking them up in Table 1 based on the sub-addresses (SUB) and passwords (SID) received from the relay broadcast instructing station (parent machine) 1.

Figure 5:
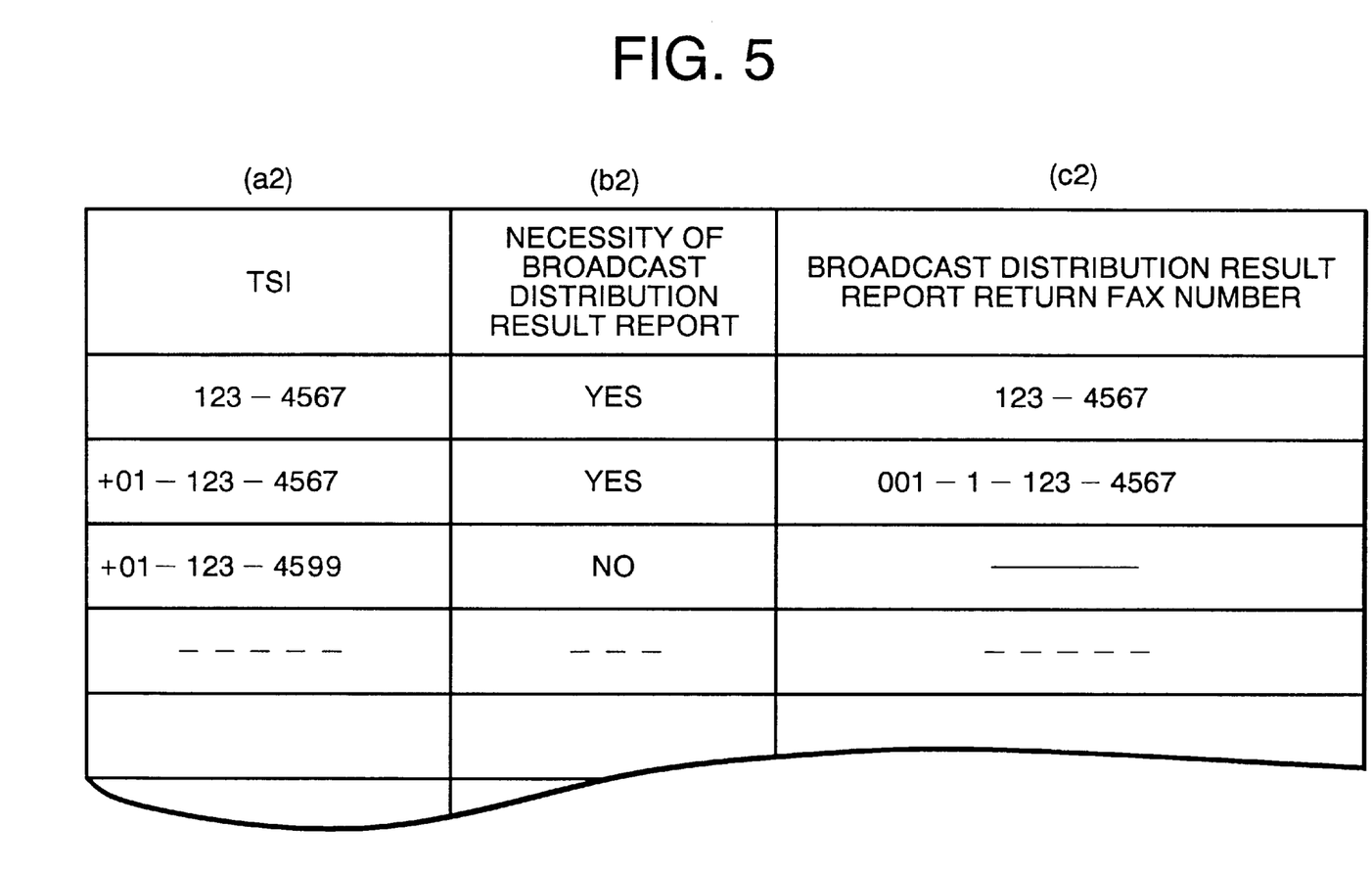
FIG. 5 illustrates another table created in the memory unit of the relay broadcast distributing station.

FIG. 5 shows another table (Table 2) used to store facsimile numbers of the parent machines to which the broadcast distribution result reports are sent. Table 2 may also be stored in the relay distribution memory mailbox stored in RAM 23. The first column a2 of Table 2 stores the transmitter subscriber identification (TSI) of parent machines in accordance with International Telecommunication Union T-Recommendations (ITU-T). TSI is expressed in the form of up to 20 characters.

The second column b2 shows necessity of the broadcast distribution result report (YES or NO); if YES, the child machine should send the report to parent machine. The third column c2 stores the facsimile numbers to which the broadcast distribution result reports are to be sent. The facsimile number is up to 40 characters in length if the number itself is stored. The facsimile number may also be stored in the form of one-touch dialing numbers, speed dial numbers, and the like.

Here, it should be assumed that the relay broadcast distributing station 2 has been designed to conform to Japanese standards. On this assumption, a country code for facsimile transmission "81" ("+81" in TSI) is considered to be a mother country code and "1" ("+1" in TSI) is considered to be a foreign country code.

In the case where, as shown in row 2 of column a2, the transmitter identification (TSI) includes a foreign country code, this code is automatically converted to that country's code for facsimile transmission when it is stored in the column c2. Thus, a perfect facsimile number is stored in the column c2. In this way, by storing a facsimile number to correspond to transmitter identification information (TSI), the parent machine 1 to which the broadcast distribution result report should be sent can be referenced in this table. After distribution of the facsimile data to the final distribution recipient grandchild machines 3a to 3d, a broadcast distribution result report will be sent back to the parent machine 1 based on the transmitter identification received from the parent machine 1.

The first row in Table 2 does not include a country code since this parent machine is located in Japan. If a domestic code "+81" is included in TSI, which would occur even when the parent machine is in Japan, it is ignored when expressed in the column c2 since the child machine 2 understands that this code is a Japan's code.

Figure 6:
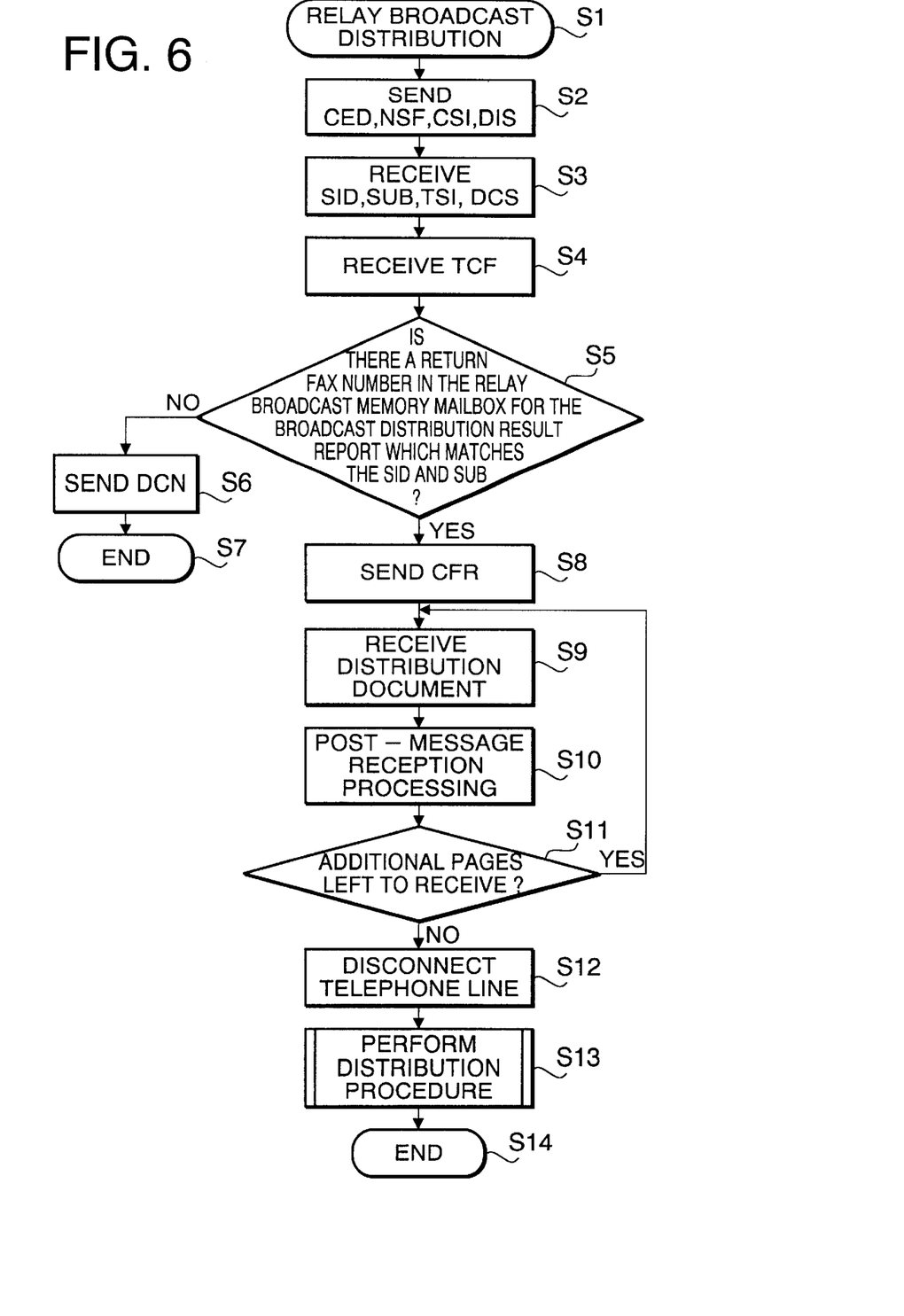
FIG. 6 is a flow chart showing an example of the relay broadcast distributing procedure which the relay broadcast instructing station instructs the relay broadcast distributing center to perform.

FIG. 6 is a flow chart showing one example of processing steps at the child machine when the relay broadcast distributing station (the child machine) is instructed by the relay broadcast instructing station (the parent machine) to broadcast documents.

At step S1, the relay broadcast distribution program is initiated, and at step S2 the child machine transmits Called Station Identification (CED), Non-standard Facilities (NSF), its Called Subscriber Identification (CSI), and Digital Identification Signal (DIS) information to the parent machine. DIS relates to facsimile capabilities.

At step S3, the child machine receives from the parent machine a password (SID), sub-address (SUB), Transmitter identification (TSI), and a Digital Command Signal (DCS) identifying the capabilities of the facsimile device. Subsequently, at step S4, the parent machine sends a Training Check (TCF) to the child machine.

At step S5 it is then determined whether or not final distribution recipient facsimile numbers corresponding to the password (SID) and sub-address (SUB) sent by the parent machine are stored in the relay memory mailbox of the child machine. If no such facsimile numbers are stored (step S5 NO), the program proceeds to step S6 where the child machine transmits a Disconnect signal (DCN) to the parent machine, and step S7 where the program is terminated.

If, on the other hand, it is determined at step S5 that such facsimile numbers are stored in the machine (step S5 YES), the program proceeds to step S8 where the child machine transmits a Confirmation to Receive (CFR) signal to the parent machine. At the next step S9 the child machine receives the first page of the original document, in the form of facsimile data, to be distributed (the "distribution document") from the parent machine, and at step S10 the child machine executes post-message reception processing as it receives an End-Of-Page (EOP) signal from the parent machine. At step S11 the child machine determines whether or not the original document includes a plurality of pages, i.e., whether or not another page is coming.

If the second page of the document is coming to the child machine (step S11 YES), then the program repeats steps S9 through S11 once again. On the other hand, if the answer at step S11 is NO, i.e., all the pages of the documents have been received, then the line is disconnected at step S12, the distribution procedure is executed at step S13, and the program then terminated at step S14.

Figure 7:
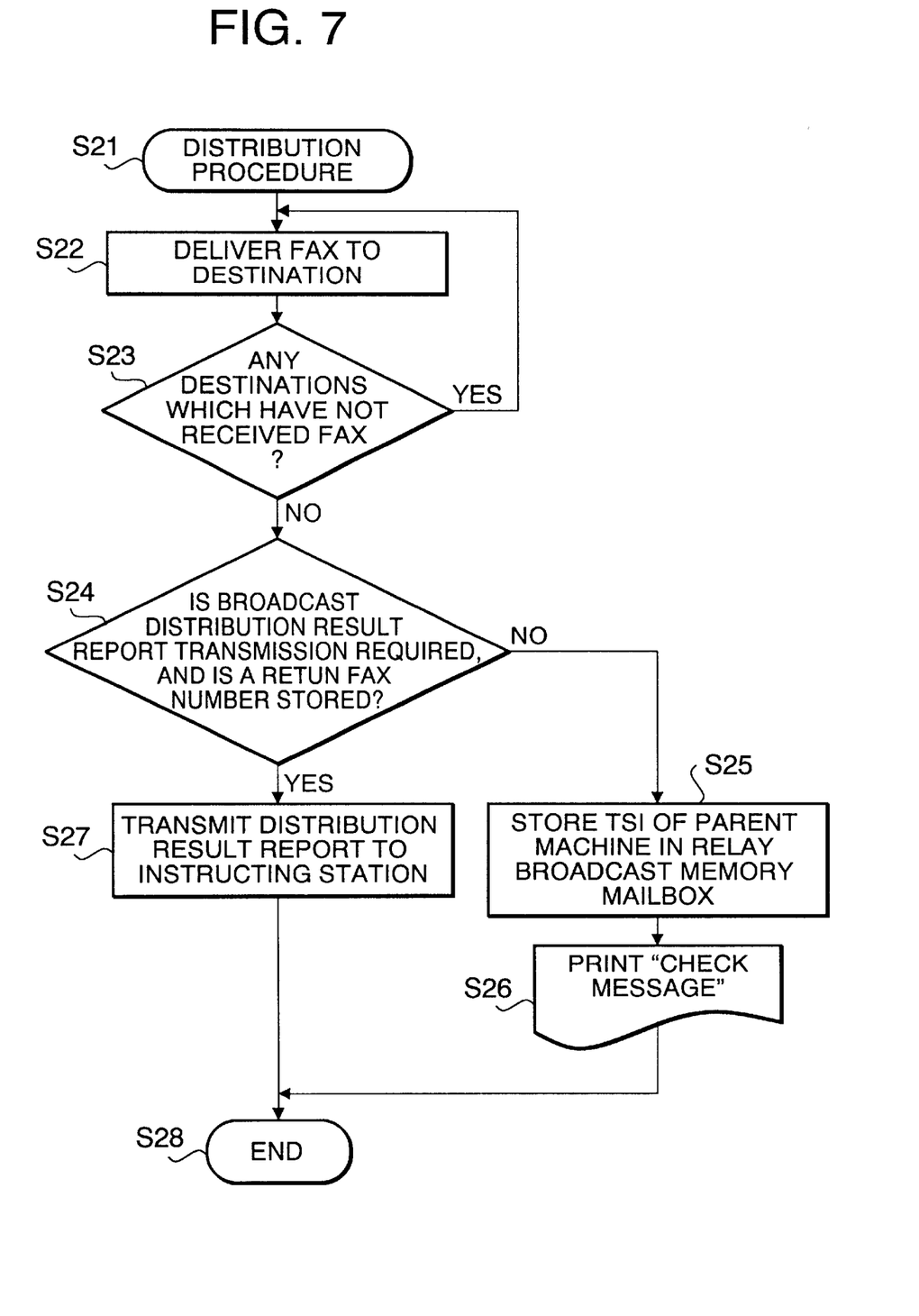
FIG. 7 is a flow chart showing the delivery processing steps executed by the relay broadcast distributing station.

FIG. 7 is a flow chart showing the distribution procedure executed by the relay broadcast distributing station (the child machine).

The distribution procedure is initiated at step S21. At step S22 executed is facsimile data distribution to the recipient grandchild machines having facsimile numbers corresponding to the sub-address (SUB) and password (SID) received from the parent machine. It is then determined at step S23 whether or not there are any recipients in the relay distribution memory mailbox of the child machine other than those to which distribution has already been completed (or in other words, whether or not there are any grandchild machines to which distribution has not been made).

If at step S23 it is determined that there are still grandchild machines to which the distribution data has not been sent (step S23 YES), then the program repeats the processing of steps S22 and S23. If at step S23 it is determined that there are no grandchild machines in the broadcast group to which the distribution facsimile data has not been sent, then the program proceeds to step S24.

At step S24 it is determined whether or not broadcast distribution result report is required for a particular relay broadcast transmission based on the TSI received from the parent machine (YES or NO in the column b2 of Table 2), and if YES, whether or not a facsimile number has been set for that particular TSI. If at step S24 it is determined that NO is set in the column b2 or no facsimile number is stored in the same row of Table 2 (step S24 NO), then the program proceeds to step S25 where the transmitter identification received from the parent machine is stored in the relay distribution memory mailbox. This procedure allows the facsimile number of the parent machine to be easily input by the user should it become necessary to transmit the broadcast distribution result report back to the parent machine.

Next, at step S26, a "check message" is printed indicating that the relay distribution has been executed, together with the content of Table 2 (TSI information of the parent machine, necessity of transmission of the report and facsimile number if any). The program then proceeds to step S28 where the program is terminated.

If at step S24, however, it is determined that the request for broadcast distribution result report transmission has been set, and that there is a facsimile number stored for that broadcast distribution result report (step S24 YES), then the program proceeds to step S27 where the broadcast distribution result report is transmitted to the relay broadcast instructing station, after which the program is terminated at step S28.

Printing out of the notification ("check message" in the diagrams) enables the operator of the child machine to easily notice that request for broadcast distribution result report transmission needs to be set (from NO to YES in Table 2), and/or a facsimile number to which the broadcast distribution result report should be sent needs to be programmed. It should be noted that the "check message" could also be displayed on the display device instead of being printed out from the printer.

Thus, by setting YES and/or programming a facsimile number of the parent machine in the columns b2 and c2 of Table 2, the broadcast distribution result report will automatically be transmitted to the parent machine in the event of future broadcast distribution request.

The facsimile apparatus illustrated and described above is disclosed in Japanese Patent Application No. 10-270448 filed on Aug. 19, 1998 in Japanese Patent Office and the subject application claims priority of this Japanese Patent Application, the entire disclosure of which is herein incorporated by reference.

What is claimed is:

1. A communication terminal device used as a relay broadcast distributing station to relay image data received from a relay broadcast instructing station to final distribution recipient machines, comprising:

storage means for storing a transmitter identification received from the relay broadcast instructing station, and a dialing number corresponding to the transmitter identification received from the relay broadcast instructing station, wherein the transmitter identification is different than the dialing number;

determining means for determining, based on the transmitter identification stored in the storage means, the dialing number of the relay broadcast instructing station; and transmission means for calling the dialing number and transmitting, to the relay broadcast instructing station, an image data distribution result report for the image data relayed from the relay broadcast distributing station to the final distribution recipient machines.

2. The communication terminal device of claim 1 further comprising:

indicating means for indicating that the dialing number corresponding to the transmitter identification is not stored in the storage means when this is the case.

3. The communication terminal device of claim 2, wherein the indicating means further indicates that the transmission means is deactivated or not.

4. The communication terminal device of claim 2 further comprising:

means for inputting the dialing number into the storage if the indicating means indicates that the dialing number is not stored in the storage means.

5. The communication terminal device of claim 1, wherein the dialing number is a facsimile number of the relay broadcast instructing station.

6. The communication terminal device of claim 1 further comprising:

means for inputting a dialing number into the storage means in connection with the transmitter identification.

7. The communication terminal device of claim 1, wherein the relay broadcast distributing station is adapted to transmit the image data distribution result report to the relay broadcast instructing station, when a first country code included a transmitter identification of the relay broadcast distributing station is different than a second country code included in the transmitter identification of the relay broadcast instructing station.

8. The communication terminal device of claim 1, wherein the relay broadcast distributing station is adapted to transmit, to the relay broadcast instructing station, the image data distribution result report for the image data relayed from the relay broadcast distributing station to the final distribution recipient machines, when a first country code of the relay broadcast distributing station is different than a second country code of the relay broadcast instructing station.

9. The communication terminal device of claim 1, wherein the relay broadcast distributing station is adapted to transmit the image data distribution result report to the relay broadcast instructing station, when a country code is not included with the transmitter identification.

10. The communication terminal device of claim 1, wherein the relay broadcast distributing station is adapted to transmit, to the relay broadcast instructing station, the image data distribution result report for the image data relayed from the relay broadcast distributing station to the final distribution recipient machines, when a country code is not included with the transmitter identification.

11. A facsimile apparatus used as a relay broadcast distributing station to relay facsimile data received from a relay broadcast instructing station to final distribution recipient machines, comprising:

storage means for storing a transmitter identification received from the relay broadcast instructing station, and a facsimile number corresponding to the transmitter identification received from the relay broadcast instructing station, wherein the transmitter identification is different than the facsimile number;

determining means for determining, based on the transmitter identification stored in the storage means, the facsimile number of the relay broadcast instructing station; and transmission means for transmitting to the facsimile number the broadcast distribution result report for the facsimile data distributed from the relay broadcast distributing station to the final distribution recipient machines.

12. The facsimile apparatus of claim 11 further comprising:

indicating means for indicating that the facsimile number corresponding to the transmitter identification is not stored in the storage means when this is the case.

13. The facsimile apparatus of claim 12, wherein the indicating means further indicates that the transmission means is deactivated or not.

14. The facsimile apparatus of claim 12 further comprising:

means for inputting the facsimile number into the storage if the indicating means indicates that the facsimile number is not stored in the storage means.

15. The facsimile apparatus of claim 11 further comprising:

means for inputting a facsimile number into the storage means in connection with the transmitter identification.

16. The facsimile apparatus of claim 11, wherein the relay broadcast distributing station is adapted to transmit the broadcast distribution result report to the relay broadcast instructing station, when a first country code included a transmitter identification of the relay broadcast distributing station is different than a second country code included in the transmitter identification of the relay broadcast instructing station.

17. The facsimile apparatus of claim 11, wherein the relay broadcast distributing station is adapted to transmit, to the relay broadcast instructing station, the broadcast distribution result report for the facsimile data distributed from the relay broadcast distributing station to the final distribution recipient machines, when a first country code of the relay broadcast distributing station is different than a second country code of the relay broadcast instructing station.

18. The facsimile apparatus of claim 11, wherein the relay broadcast distributing station is adapted to transmit the broadcast distribution result report to the relay broadcast instructing station, when a country code is not included with the transmitter identification.

19. The facsimile apparatus of claim 11, wherein the relay broadcast distributing station is adapted to transmit, to the relay broadcast instructing station, the broadcast distribution result report for the facsimile data distributed from the relay broadcast distributing station to the final distribution recipient machines, when a country code is not included with the transmitter identification.

20. A communication terminal device used as a delay broadcast distributing station to relay image data received from a relay broadcast instructing station to final distribution recipient machines, comprising:

storage means for storing a transmitter identification received from the relay broadcast instructing station, and a dialing number associated with the transmitter identification, wherein the transmitter identification is different than the dialing number; and determination means for determining whether there is the dialing number in the storage means which matches at least one of a password and a sub address of the relay broadcast instructing station;

transmission means for making a call using the dialing number and transmitting to the relay broadcast instructing station image data distribution results from the relay broadcast distributing station to the final distribution recipient machines.

21. The communication terminal device of claim 20, further comprising:

indicating means for indicating that the dialing number associated with the transmitter identification is not stored in the storage means when this is the case.

22. The communication terminal device of claim 21, wherein the indicating means further indicates that the transmission means is deactivated or not.

23. The communication terminal device of claim 21, further comprising:

means for inputting the dialing number into the storage if the indicating means indicates that the dialing number is not stored in the storage means.

24. The communication terminal device of claim 20, wherein the dialing number is a facsimile number of the relay broadcast instructing station.

25. The communication terminal device of claim 20, further comprising:

means for inputting a dialing number into the storage means in connection with the transmitter identification.

26. The communication terminal device of claim 20, wherein the relay broadcast distributing station is adapted to transmit the image data distribution results to the relay broadcast instructing station, when a first country code included a transmitter identification of the relay broadcast distributing station is different than a second country code included in the transmitter identification of the relay broadcast instructing station.

27. The communication terminal device of claim 20, wherein the relay broadcast distributing station is adapted to transmit, to the relay broadcast instructing station, the image data distribution results from the relay broadcast distributing station to the final distribution recipient machines, when a first country code of the relay broadcast distributing station is different than a second country code of the relay broadcast instructing station.

28. The communication terminal device of claim 20, wherein the relay broadcast distributing station is adapted to transmit the image data distribution results to the relay broadcast instructing station, when a country code is not included with the transmitter identification.

29. The communication terminal device of claim 20, wherein the relay broadcast distributing station is adapted to transmit, to the relay broadcast instructing station, the image data distribution results from the relay broadcast distributing station to the final distribution recipient machines, when a country code is not included with the transmitter identification.

30. A facsimile apparatus used as a relay broadcast distributing station to relay facsimile data received from a relay broadcast instructing station to final distribution recipient machines, comprising:

storage means for storing a transmitter identification received from the relay broadcast instructing station, and a facsimile number associated with the transmitter identification, wherein the transmitter identification is different than the facsimile number;

determination means for determining whether final distribution recipient facsimile numbers associated with a password and a sub-address sent by the relay broadcast instructing station are stored in the storage means of the relay broadcast distributing station; and transmission means for transmitting to the facsimile number a broadcast distribution results report or the facsimile data distributed from the relay broadcast distributing station to the final distribution recipient machines.

31. The facsimile apparatus of claim 30, further comprising:

indicating means for indicating that the facsimile number associated with the transmitter identification is not stored in the storage means when this is the case.

32. The facsimile apparatus of claim 31, wherein the indicating means further indicates that the transmission means is deactivated or not.

33. The facsimile apparatus of claim 31, further comprising:

means for inputting the facsimile number into the storage if the indicating means indicates that the facsimile number is not stored in the storage means.

34. The facsimile apparatus of claim 30, further comprising:

means for inputting a facsimile number into the storage means in connection with the transmitter identification.

35. The facsimile apparatus of claim 30, wherein the relay broadcast distributing station is adapted to transmit the broadcast distribution results report to the relay broadcast instructing station, when a first country code included a transmitter identification of the relay broadcast distributing station is different than a second country code included in the transmitter identification of the relay broadcast instructing station.

36. The facsimile apparatus of claim 30, wherein the relay broadcast distributing station is adapted to transmit, to the relay broadcast instructing station, the broadcast distribution results report for the facsimile data distributed from the relay broadcast distributing station to the final distribution recipient machines, when a first country code of the relay broadcast distributing station is different than a second country code of the relay broadcast instructing station.

37. The facsimile apparatus of claim 30, wherein the relay broadcast distributing station is adapted to transmit the broadcast distribution results report to the relay broadcast instructing station, when a country code is not included with the transmitter identification.

38. The facsimile apparatus of claim 30, wherein the relay broadcast distributing station is adapted to transmit, to the relay broadcast instructing station, the broadcast distribution results report for the facsimile data distributed from the relay broadcast distributing station to the final distribution recipient machines, when a country code is not included with the transmitter identification.

\* \* \* \* \*